Patented May 7, 1946

2,399,911

UNITED STATES PATENT OFFICE 2,399,911

FORMULA FOR TREATING TOBACCO

Euripides H. Constantine, Brooklyn, N. Y.

No Drawing. Application December 2, 1944,
Serial No. 566,393

8 Claims. (Cl. 131—17)

The invention relates to smoking tobacco for cigarettes and the like processed to have beneficial effects upon the teeth, gums and other parts of the mouth and throat of the smoker, and to an improved substance for treating tobacco for this purpose.

The primary object of the invention is to provide a treatment for tobacco so that when the treated tobacco is smoked in cigarette or other form, the mouth and breath of the smoker will be left sweet and freshened, and otherwise benefitted, the treatment being relatively inexpensive and easy to carry out.

Other important objects of the invention will be seen in the following description, wherein for un-limitative illustration a preferred embodiment is set forth in detail.

The tobacco treating substance consists of the resultant obtained by compounding in a manner hereinafter described, the following ingredients in substantially the relative proportions given:

1 pound of dried figs
    1 ounce (dry weight) of salt
    1 cake of yeast
    32 ounces of pure orange extract
    1⅛ gallons of water As is well known dried figs show an ash content of substantially .162% of calcium, .071% of magnesium, .964% of potassium, .046% of sodium, .116% of chlorine, .056% of sulphur, and .00287% of iron. The presence of these substances have their useful effects in the product of the present invention although no special theory is advanced to assign them other than their usual beneficial effects in oral hygiene.

The foregoing ingredients are compounded by mixing the dried figs and the salt together in the water, and then slowly boiling for about two and one-half hours.

The resultant is cooled and the cake of yeast added and the mixture is allowed to ferment for about three days, and the product is then filtered, and the pure orange extract is added to it.

The figs used in the compound must be chopped in small pieces and it is preferable that the yeast is compressed cultured yeast in standard cake size. The orange extract is U. S. P. such as used commonly for food flavoring.

The substance thus obtained is then applied to the tobacco leaves or to the cut tobacco in some suitable conventional manner so that the tobacco absorbs the fluid, and becomes impregnated therewith.

What I claim as new is:

1. Smoking tobacco comprising tobacco impregnated with a fluid comprising a yeast fermentation of a boiled mixture of dried figs and salt, flavored with orange extract.

2. A tobacco product comprising tobacco bearing an impregnation obtained by boiling a mixture of figs and salt, fermenting the resultant by means of yeast, followed by filtration, and the addition of a citrus extract.

3. A substance for impregnating tobacco comprising a boiled mixture of figs, salt, and water, fermented when cool by the addition thereto of yeast, and filtered.

4. A fluid for the impregnation of smoking tobacco comprising the product of a yeast fermented boiled mixture, of figs, salt, water and a citrus fruit extract.

5. A fluid for treating smoking tobacco comprising a boiled mixture of substantially 1 pound of figs, 1 ounce of salt, and 1⅛ gallons of water, fermented by the addition of about 1 cake of yeast, and flavored by the addition of about 32 ounces of pure orange extract.

6. Process of producing tobacco treating substance consisting in slowly boiling a mixture of dried figs, salt, and water, then cooling the resultant and fermenting it by adding yeast thereto, and adding flavoring extract to the ferment.

7. Process of producing tobacco treating substance consisting in slowly boiling for about two and one-half hours a mixture of about 1 pound of dried figs, one ounce of salt, and 1⅛ gallons of water, then adding about one cake of yeast to the resultant and allowing fermentation to proceed for about three days, then filtering the resultant and adding thereto about 32 ounces of pure orange extract.

8. Method of treating smoking tobacco consisting in impregnating the tobacco with a fluid comprising a flavored, yeast fermented boiled mixture of dried figs, salt and water.

EURIPIDES H. CONSTANTINE.